May 5, 1970  E. H. RICHARDSON  3,510,203

SUPERPOSITIONING IMAGE SLICER

Filed Aug. 8, 1967  5 Sheets-Sheet 1

INVENTOR
ERIC H. RICHARDSON
BY
Amster & Rothstein
ATTORNEYS

INVENTOR
ERIC H. RICHARDSON
BY
Amster & Rothstein
ATTORNEYS

FIG.6

May 5, 1970  E. H. RICHARDSON  3,510,203
SUPERPOSITIONING IMAGE SLICER
Filed Aug. 8, 1967  5 Sheets-Sheet 5

FIG. 8

INVENTOR
ERIC H. RICHARDSON
BY
Amster & Rothstein
ATTORNEYS

United States Patent Office 3,510,203
Patented May 5, 1970

3,510,203
SUPERPOSITIONING IMAGE SLICER
Eric H. Richardson, Apt. 35, 1705 Newton St.,
Victoria, British Columbia, Canada
Filed Aug. 8, 1967, Ser. No. 659,098
Int. Cl. G02b 17/08
U.S. Cl. 350—200                                10 Claims

ABSTRACT OF THE DISCLOSURE

An optical system for transforming the image of a source of light to facilitate examination having a pair of concave mirrors spaced apart to form a slot between them substantially on the longitudinal axis of the optical system, light from the source passing through the slot and through a slit formed between two concave slit mirrors facing the pair of slot mirrors and spaced therefrom along the optical system's axis. Light which does not pass through the slit will thus strike the slit mirrors, be reflected to the slot mirrors and then be reflected back through the slit. By multiple reflection, substantially all the light passing through the slot may be passed through the slit for examination in subsequent apparatus.

---

This invention relates to optical systems for transforming the image of a source of light to facilitate examination and, more particularly, relates to improvements in optical systems in spectroscopy, for example in spectrometers and spectrographs.

Optical systems of the type to which the present invention relates are sometimes called "Optical Image Transformers" or "Image Slicers."

In the spectroscopic examination of the light emanating from a source, the light is passed through an entrance slit, the width of which determines, within limits, the resolving power of the instrument. It is, of course, extremely desirable that all the light from the source under examination passes through the entrance slit. However, if the beam of light which is incident on the slit has a width which is greater than the width of the slit, then obviously all of the light does not pass through the slit when it is first incident thereon.

There have been many proposals for increasing the amount of light passing through the entrance slit of a spectrometer. U.S. Pat. No. 2,940,355 (Henry H. Cary) issued June 14, 1960, discloses a Raman spectrophotometer and describes a method of increasing the amount of Raman radiation which enters the spectrometer. A Lagrange-constant transformer, employing two image slicers, is utilized to provide a pattern of slices along a slit and an additional optical arrangement must be included for each additional slice. This is, of course, a disadvantage.

Image slicers have, in the past, been used in a number of ways to increase the efficiency of a spectrometer. One such system is disclosed in an article published by a Doctor I. S. Bowen in the Astrophysical Journal, volume 88, page 113 (1938). In Dr. Bowen's system, a single image slicer is employed to slice the image of a distant star into a series of segments which are then stacked one above another in a linear array at the entrance slit of a spectrograph. In this arrangement, the slicing and stacking is accomplished in part by a plurality of mirrors arranged in echelon fashion and tilted with respect to the path of transmission of the radiation. Such a system is effective only when the angle of the received beam is very small.

Another type of image slicer has been described by Dr. William Benesch and Dr. John Strong in the Journal of the Optical Society of America, vol. 41, page 252 (1951). In the Benesch and Strong system, a single image slicer is employed to slice an image of the sun into a number of segments and these segments are then projected through an equal number of vertically spaced sections of the entrance slit of a spectrograph. In this system, the sets of elements that achieve the slicing and rearrangement of the image parts are in the form of spherical mirrors. The device produces only three slices and it is not "in-line," i.e. the direction of the beam is changed.

In the Bowen image slicer and the Benesch and Strong slicer, a pattern of slices appears along the slit and an additional optical arrangement must be added for each additional slice. This is again a disadvantage.

It is an object of the present invention to provide an optical system in which the above-mentioned disadvantages are obviated or substantially reduced.

Accordingly, there is provided an optical system for transforming the image of a source of light to facilitate examination, including at least one aperture mirror having a slot formed therein for passage of light for said image therethrough, at least one slit mirror having a slit formed therein, said slit mirror being spaced from the aperture mirror along the longitudinal axis of the optical system whereby light passing through said slot which does not immediately pass through the slit is reflected one or more times between the aperture mirror and the slit mirror so that at least a portion thereof is subsequently directed through said slit after each reflection by the aperture mirror until substantially all of said light is passed through said slit.

More specifically, the present invention provides an optical system for transforming the image of a source of light to facilitate examination, including a pair of aperture mirrors spaced apart in a longitudinal direction to form a slot therebetween for passage of light from said image therethrough, a pair of slit mirrors spaced apart in a longitudinal direction to form a slit therebetween, said pair of slit mirrors being spaced from the pair of aperture mirrors along the longitudinal axis of the optical system whereby light passing through said slot which does not immediately pass through the slit is reflected one or more times between the aperture mirrors and the slit mirrors so that at least a portion thereof is subsequently directed through said slit after each reflection by the aperture mirrors until substantially all of said light is passed through said slit.

There is also provided a beam transformer for insertion in a beam of light to intercept a portion thereof and transpose it into a different position in said beam of light including a centrally located optical element having at least one reflecting surface inclined at 45° to the longitudinal axis of the beam of light, and a further optical element having at least one reflecting surface substantially parallel to said first-mentioned reflecting surface whereby incident light in said beam is reflected from the reflecting surface in said further optical element onto the first-mentioned reflecting surface and is transmitted parallel to the longitudinal axis of the beam of light to at least partially fill said different position in said beam of light.

The invention will now be described, by way of example, with reference to the accompanying drawings in which.

Figure 1:
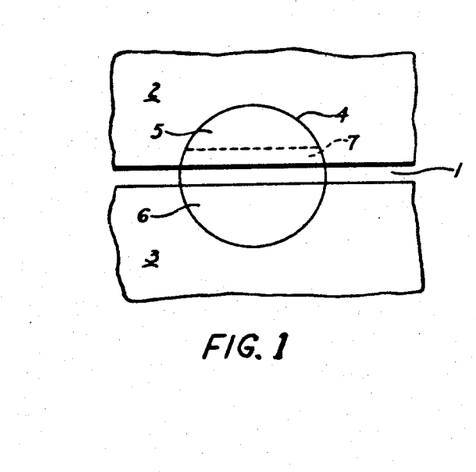
FIG. 1 is a diagrammatic representation illustrating a beam of light incident on a slit.

Referring to FIG. 1, there is shown a slit 1 formed between two slit-forming members 2 and 3. A spot of light 4 due to an incident beam of light falling on the slit is also shown in FIG. 1 and it will be seen that only a fraction of the spot of light 4 passes through the slit 1 because of the restricted width of the slit 1. This is, as mentioned above, a disadvantage when examining the light emanating from a particular source, such as a heavenly body.

By means of the apparatus to be described with reference to FIG. 2, a substantial portion of the areas 5 and 6 of the spot of light 4 may be passed through the slit 1. For example, the portion designated by the numeral 7 may be transmitted through the slit 1 after one reflection in apparatus according to the present invention. The portion 7 will illuminate the full length of the slit and as successive portions of the spot of light 4 are transmitted through the slit 1, so will substantially all the light energy contained within the corresponding beam of light be transmitted through the slit 1 for examination. In this manner, the spot of light 4 is effectively transformed in shape to conform to the shape of the slit 1, and is transmitted through the slit 1 for examination by instruments, such as spectrometers and spectrographs. This type of transformation of an image of a source of light focussed, for example, by some primary optic is often referred to as a slicing operation and the optical system used is sometimes referred to as an image slicer.

Figure 2:
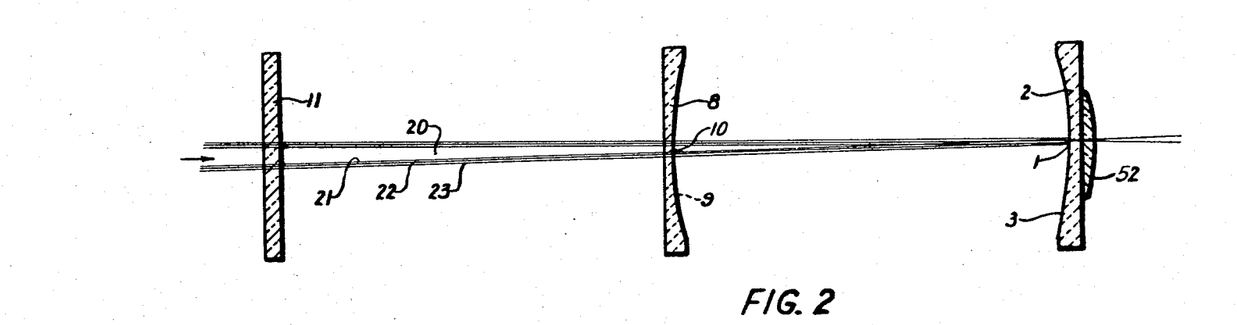
FIG. 2 is a diagrammatic representation of a plan view of an optical system according to the present invention.

An optical system or image slicer according to the present invention is shown in FIG. 2 and will be seen to include six optical elements for performing the necessary transformation. A slit 1 is formed between a pair of slit-forming members 2 and 3. These are concave slit mirrors which are aligned with two concave aperture mirrors 8 and 9 to form a multiple-reflection mirror system. The aperture mirrors 8 and 9 are spaced apart so as to form a slot 10 therebetween for the passage of a beam of light therethrough. It is arranged that the slot 10 is a horizontal slot separating the two halves of the aperture mirrors whilst the slit 1 is a vertical slit between the pair of slit mirrors 2 and 3. It will be appreciated that in some instances, it may be possible to construct a single mirror having a suitable slit in place of the pair of slit mirrors 2 and 3 and also to provide a single mirror having a suitable slot in place of the aperture mirrors 8 and 9. Furthermore, in use, the slit 1 may constitute the entrance slit of an analyzer device.

In the embodiment shown in FIG. 2, a cylindrical lens 11 is provided in front of the aperture mirrors 8 and 9 whilst a spherical lens 52 is located immediately after the slit mirrors 2 and 3. If desired, the field lens 52 may alternatively be a cylindrical lens.

Figures 4, 5:
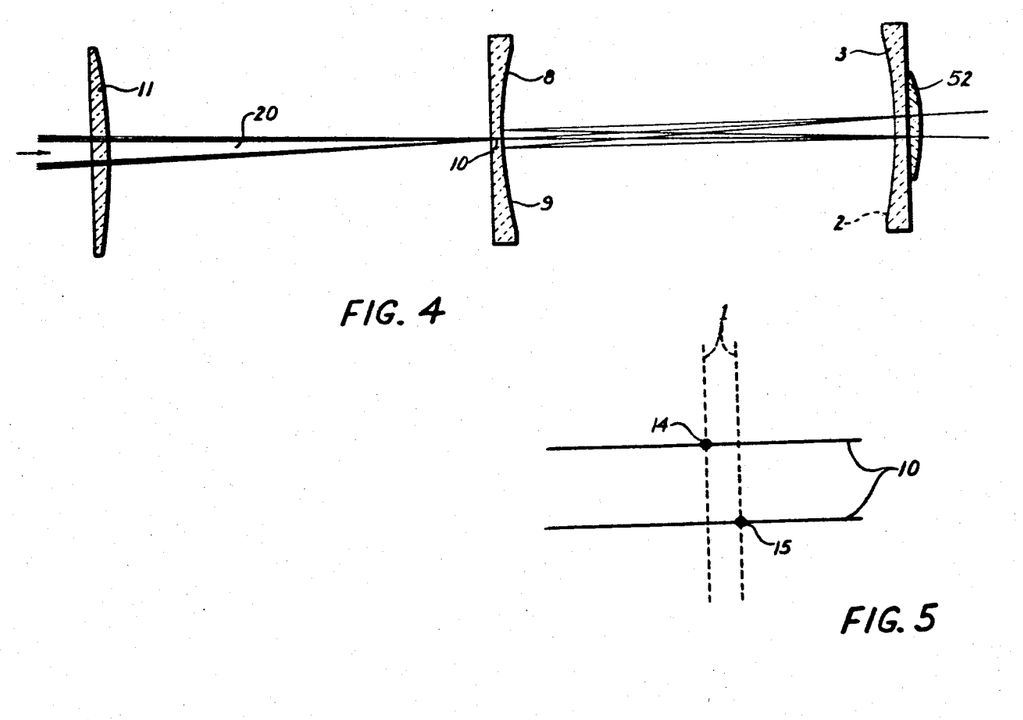
FIG. 4 is a diagrammatic representation of a side view of an optical system according to the present invention.
FIG. 5 is a diagrammatic end view of the slot separating the aperture mirrors in the optical system of FIG. 4 to illustrate the position of the centers of curvature of the slit mirrors.

The optical system is shown in plan view in FIG. 2 and in side view in FIG. 4 and considering the optical elements in the order in which light would pass through them, the cylindrical lens 11 is a positive lens with its axis horizontal. If one imagines that an original source image appearing at slit 1 is made up of a number of point images, then these would be refocussed by the cylindrical lens 11 in a vertical dimension but not in a horizontal dimension where the lens merely acts as a window; thus two line images are formed, one horizontal and one vertical. This will be considered in greater detail below but will be clear to the man skilled in the art from a consideration of FIGS. 2 and 4.

As mentioned above, the slot 10 separating the aperture mirrors 8 and 9 is horizontal and its edges lie along the upper and lower edges of the horizontal image. Both the aperture mirrors have exactly the same radius of curvature as the slit mirrors and the centers of curvature of the aperture mirrors are displaced horizontally by an amount equal to the width of the slit 1 and are located exactly on the two edges of the slit at its center. This is shown in FIG. 1 where it will be seen that the centers of curvature 12 and 13 of the aperture mirrors are located at the center of the slit 1. The center of curvature of a respective one of the aperture mirrors 8 and 9 is located at the edge of that particular slit mirror 2 or 3 which has its own center of curvature located at the edge of that respective aperture mirror 8 or 10.

As will be appreciated, the length of the slot 10 may be restricted to the total length of the required horizontal image and a reflecting wedge may be placed on the flat backs of the aperture mirrors so that if light fails to enter the slot 10 after passing through the cylindrical lens 11, then it can be seen.

The slit mirrors 2 and 3 form the jaws of the slit 1 and have exactly the same radius of curvature which is equal to the distance from the horizontal image formed between the aperture mirrors 8 and 9. The centers of curvature 14 and 15 (FIG. 5) of the two slit mirrors 2 and 3 are arranged to be on the upper and lower edges of the horizontal image substantially at its center but they are, however, displaced horizontally with respect to each other by an amount equal to the displacement of two horiontal line images corresponding to two vertical line images separated by the width of the slit 1. This is shown in FIG. 5 where for convenience, two interrupted lines are used to show the extremities of the slit 1 across its width, although it will be appreciated that when viewing the aperture mirrors, the slit 1 cannot, of course, be seen. Similarly, in FIG. 3, two interrupted lines are utilized to illustrate the spacing of the slot 10. In the usual case of a comparatively distant primary optical element, the horizontal displacement of the centers of curvature equals the width of the slit and it is to be appreciated that the choice of the slit width is based on the characteristics of the analyzer device.

From the above, it will be seen that light intercepted by the slit mirrors 2 and 3 forming the jaws of slit 1 is reflected back and focusses into two additional horizontal images on the aperture mirrors 8 and 9 lying immediately above and below the original horizontal image.

As mentioned above, the field lens 52 is positive and spherical. However, it will be appreciated that it may be cylindrical with a horizontal axis. Its focus length is approximately equal to the distance from the field lens 52 to the horizontal image formed between the aperture mirrors 8 and 9. The exact focal length depends, of course, on where it is intended that the horizontal image should be focussed in the subsequent analyzer device—normally, it is desired that it be focussed onto the effective aperture stop of the analyzer's dispersive element—for example, a diffraction grating or prism.

The operation of the optical system shown diagrammatically in FIGS. 2 to 5 will now be described and it will be assumed that a beam of light from a source of light to be examined is incident on the cylindrical lens 11. It will be assumed that a prior primary optical element focusses an image of the light source onto the entrance slit 1 of the subsequent analyzer device. This image can be considered as being composed of a large number of point images, each point being the apex of an incident cone of light with the aperture stop of the primary optical element constituting the base of the cone. In FIG. 2, it can be seen that the beam of light 20 includes cones 21, 22, and 23. By means of the optical system illustrated in FIGS. 2 to 5, all of these point images are transformed into line images parallel to the slit 1 and those line images which fall on the slit mirrors 2 and 3 instead of passing through the slit are reflected and re-imaged one or more times, the arrangement being such that each new image is located progressively closer to the slit until eventually the reflected image passes through the slit 1.

As mentioned above, the cylindrical lens 11 is positive with its axis horizontal. Each of the point images making up the original source image at the slit 1 is re-focussed by lens 11 in the vertical direction but not in a horizontal direction where the lens 11 merely acts as a window. In horizontal cross-section, as shown in FIG. 2, the converging cones of light have an apex at the slit 1 as before but in vertical cross-section, as shown in FIG. 4, the cones of light have already passed through their focus and are diverging as they reach the slit 1. Thus, two line images are formed from each of the original point images, a first vertical line image at the slit 1 and secondly, a horizontal line image between the lens 11 and the slit 1. The horizontal line image is formed, in practice, at the slot 10 between slot-forming aperture mirrors 8 and 9. The length of the horizontal line image is equal to the width, at the slot 10, of the cone of light converging in a horizontal dimension to its apex at the slit 1 (FIG. 2). The focal length of the cylindrical lens 11 is so selected that each of the vertical line images at slit 1 is equal to the desired length of slit 1 and so that the vertical line images are not displaced vertically with respect to each other. In this way, a vertically elongated image is formed at the slit.

FIG. 2 represents the normal situation where the distance to the primary optical element aperture stop is much greater than the focal length of the cylindrical lens 11. Furthermore, the width (measured vertically) of the horizontal image is one-half the width (measured horizontally) of the vertical image and the length of the horizontal image equals one-half the length of the vertical image plus the width of the vertical image. In this case, the focal length of the lens 11 is also equal to its distance from the slit 1.

As mentioned above, the beam of light passes through the slit 10 and any light which does not pass immediately through the slit 1 is incident on the slit mirrors 2 or 3. The centers of curvature 14 and 15 of the slit mirrors are displaced horizontally with respect to each other (see FIG. 5) by an amount equal to the displacement of two horizontal line images corresponding with two vertical line images separated by the width of the slit. The aperture mirrors 8 and 9 intercept the two additional horizontal line images focussed by the slit mirrors 2 and 3 and they reflect this light back to the slit 1 with a shift in position so that at least a portion of that reflected light passes through the slit 1. The rest of the reflected light is again reflected by the slit mirrors 2 and 3 into two more horizontal images located above and below the other two. This process of multiple reflection is repeated until all of the light has passed through the slit 1 or until the aperture mirrors 8 and 9 are overrun.

Figure 3:
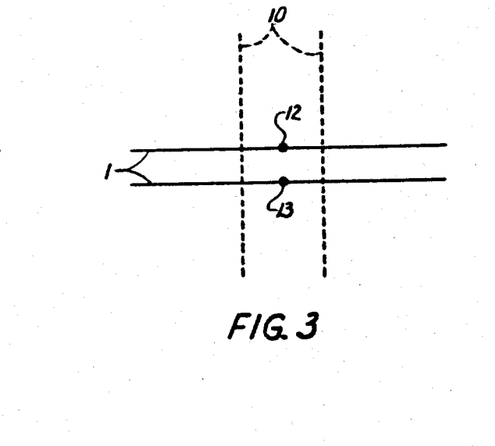
FIG. 3 is a diagrammatic end view of the slit mirrors of FIG. 2 to illustrate the position of the centers of curvature of the aperture mirrors.

The above-mentioned operation of multiple reflection can best be visualized by an expert in the art by considering the reflection of images through points, each point being one of the four centers of curvature 12, 13, 14 or 15 (FIGS. 3 and 5). Every image falling on any one of the slit mirrors 2 or 3 is reflected through the point 12 or 13 located on that particular mirror. First, the vertically elongated image is divided by the slit 1 and the light passing through slit 1 is the first slice and is not subjected to any reflections by the mirrors. The remainder of the image, corresponding to areas 5 and 6 (FIG. 1), is incident on the slit mirrors 2 or 3 and is reflected through the points 12 or 13 and thus folds over the slit 1, crossing from one slit mirror 2 or 3 to the other and resulting in two more slices passing through the slit 1. This process is repeated until there is no image left and all the incident light has passed through the slit 1.

At the aperture mirrors 8 and 9, the light entering through the slot 10 and not passing through slit 1 is reflected by the slit mirrors 2 and 3 through the respective points 14 and 15 lying at the edges of the slot (FIG. 5), thus making two images of the slot 10 immediately above and below it. Each of the images thus formed is then reflected by a slit mirror through the point 14 or 15 on the other side of the slot 10 over to the other aperture mirror, and so on, thus producing a vertical stack of images. Because the points 14 and 15 are displaced horizontally with respect to each other, as well as vertically, the stack is askew; however, the stack which appears on the dispersive element of the subsequent analyzer device, or which can be viewed by looking in through the field lens 52, is *not* askew. The reason for this is that the horizontal line images which enter through the slot 10 and which make up the original horizontal image are displaced horizontally with respect to each other and the number of reflections required before the light from any one of these images passes through the slit 1 is proportional to the original horizontal displacement of the image. The horizontal displacement of the reflection points, i.e. the centers of curvature 14 and 15, along the slot's edges are such that the horizontal displacement of the line images decreases with each reflection and reaches zero when their light passes through the slit 1, i.e. when they can be seen. Thus, the visible horizontal images lie directly above and below each other and the stack is not askew. The askew stack of full-length slot images can be seen if the illustrated optical system or image slicer is illuminated with diffuse light.

It will be appreciated that the optical system described above can be inserted into an established analyzing system effectively "in-line" therewith without requiring any change in the location of either the primary optical element of the established system or of the analyzer device forming part of that system. Furthermore, when used with spectrographs which focus the light onto a photographic emulsion, the spectrograms should not be made streaky by a slicing operation utilizing the optical system described above. In other words, slices are not visible on the slit.

Furthermore, the length of the illumination on the slit is not altered by a variation in the size of the source when using the embodiments of the present invention described. This property is of significance when the image slicer described above is used with a spectrograph on a telescope because the size of the image of a star varies with time due to atmospheric turbulence, or "seeing." Also, it should no longer be necessary to "trail" the stellar image up and down the slit. Further advantages will be apparent to one skilled in the art.

It will be appreciated that in some instances, it may be desirable to arrange that the cylindrical lens 11 is provided with a negative surface (concave), or a positive surface (convex), in place of the illustrated "plano" surface. Similarly, it may sometimes be desirable to replace the simple cylindrical and field lenses with more complex lens systems, such as achromats.

Figure 6:
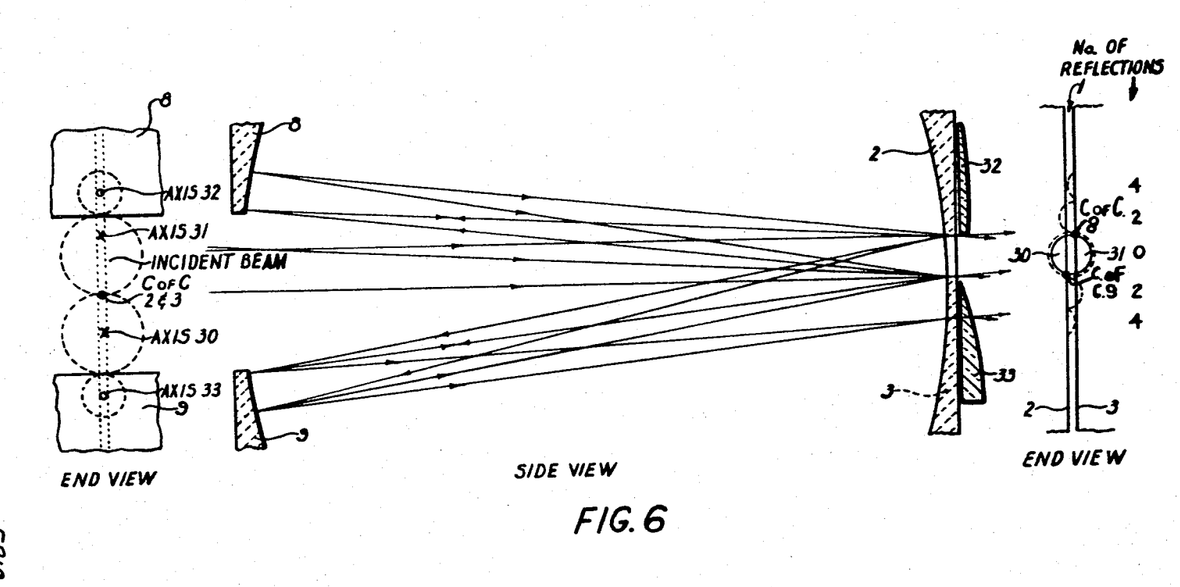
FIG. 6 is a diagrammatic representation of a second embodiment according to the present invention.

In FIG. 6, there is shown another embodiment of the invention in which a cylindrical lens is not used. This may be referred to as a non-superpositioning, multiple-reflection image slicer arrangement. FIG. 6 includes a side view of the slicer arrangement and for explanatory purposes, also includes end views thereof. A few indicative rays are also shown in the diagrammatic representation of the in-line slicer.

Monitoring of the incident beam to ensure that it is correctly aligned with respect to the image slicer can, of course, be done in a number of ways. In FIG. 6, the slit mirrors 2 and 3 and the aperture mirrors 8 and 9 can clearly be seen and in the end view of the slit mirrors, the slit 1 therebetween is clearly indicated—it will be appreciated that the "end views" in FIG. 6 are drawn as seen by an observer inside the slicers.

Whilst the slit mirrors 2 and 3 are indicated in FIG. 6 as defining part of the slit 1, in fact, smaller additional slit mirrors 30 and 31 are used to define a central portion of the slit. Incident light which does not either hit the slit mirror 30 or 31 or pass through the slit must strike the larger slit mirrors 2 or 3 whereupon it is reflected back out of the image slicer for monitoring either at an off-axis position as shown in FIG. 6 or at an on-axis position. Off-axis monitoring can be continuous (e.g. astronomical "guiding") but on-axis monitoring would be interrupted by periodic insertion of a mirror (at least partly reflecting) into the incident beam (an advantage is that the lower field lens is no longer further off-axis and, therefore, no thicker than the upper lens). Also, if the entrance aperture in the aperture mirrors 8 and 9 is made the same size as the usable incident beam, then unusable light will be reflected back from the backs of the aperture mirrors 8 and 9 (as with the superpositioning slicer illustrated in FIGS. 2 to 5).

The smaller slit mirrors 30 and 31 in FIG. 6 have about twice the radius of curvature of slit mirrors 2 and 3 and focus the external aperture stop of the incident beam onto the aperture mirrors 8 and 9. The two field lenses 32 and 33 are preferably cylindrical and are set to bring the two images of the aperture stop together as required inside any spectrograph or spectrometer associated with the optical system according to the present invention illustrated in FIG. 6.

In use, the first slice passes straight through without being subjected to any reflections and without going through any lens. The remaining slices pass through only one lens and the second and third slices are subjected to two reflections, the fourth and fifth to four reflections, etc. (the reflection loss being the same as in the super-positioning slicer of FIGS. 2 to 5).

The small slit mirrors 30 and 31 may be made with the same radius of curvature as the larger slit mirrors 2 and 3 but in this case, the centers of curvature (C. of C.) of mirrors 2 and 3 must be displaced with respect to each other by an amount equal to the width of the slit. The centers of curvature of the small slit mirrors 30 and 31 are similarly displaced to maintain collimation in any spectrograph associated with the optical system.

As will have been appreciated from the above description, a feature of the superpositioning image slicer illustrated in FIGS. 2 to 5 is the incorporation of a multiple-reflection mirror system to perform the actual slicing operation. The system illustrated in FIG. 6 is a multiple-reflection mirror system for image slices which are not superpositioning. In these cases, the stack of slices appears on the slit (as with the above-mentioned Bowen slicer) but not on the grating or prism of a spectrograph, i.e. not on the aperture mirror inside the slicer. A characteristic common to these non-superpositioning, multiple-reflection slicers is that the cylindrical lens is eliminated and an undistorted image to-be-sliced is focussed onto the slit mirrors by some external optical arrangement. Thus, there is provided a further embodiment of an image slicer according to the present invention which still utilizes at least one field lens.

Figure 7:
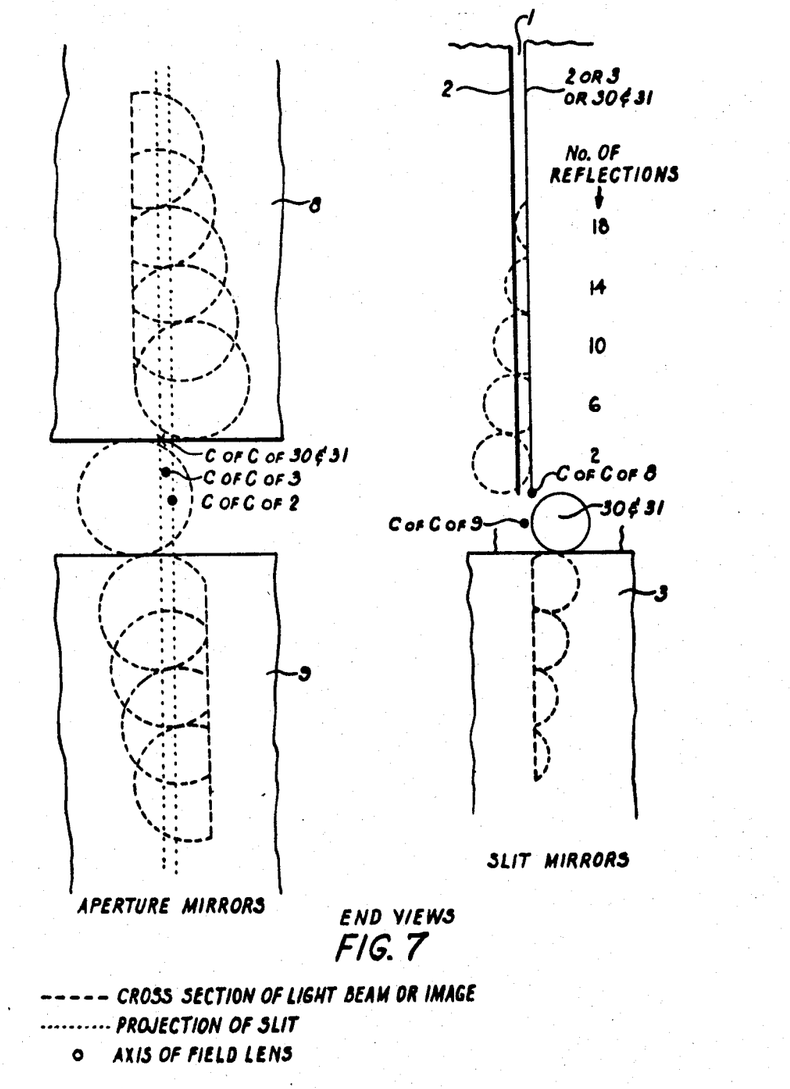
FIG. 7 is a diagrammatic representation of a further embodiment of the present invention.

Referring to FIG. 7, there is diagrammatically illustrated an optical system which is "all reflecting" and which does not utilize a field lens. The number of optical elements is thus reduced to a minimum. It will be seen that the system shown in FIG. 7 utilizes five mirrors of the same radius of curvature and that no lenses are used at all. However, it is no longer precisely in line: in use, the slicers are stacked on only one side of the original image resulting in a linear displacement of the slit 1 at the focal plane of any spectrograph used (the same is also true with the standard above-mentioned Bowen slicer) and there is also an angular displacement which can be eliminated by an appropriate rotation of the image slicer as a whole about an axis perpendicular to both the slit 1 and the axis of the incident beam. There is then a corresponding increase in the vertical linear displacement of the stack of slices on the slit 1.

One disadvantage of the minimum slicer illustrated in FIG. 7 is that the reflection loss is greatly increased. For example, the fifth slice is subjected to eighteen reflections compared with the four reflections in those image slicers utilizing a field lens as shown in FIGS. 2 to 6.

The now single mirror 30, 31 of FIG. 7 is required to keep the slicer approximately in-line, that is to prevent a very large change in the direction of the beam on exit from the slicer system. However, 30, 31 can be eliminated provided there is an aperture where the incident image previously intercepted 30, 31. That is, the incident light may then enter through the back of the slit mirror and be directed onto slit mirror 8. The slicer can be positioned so that the light is reflected out not exactly in the direction from which it came, but a few degrees off this axis so that it can be intercepted by the collimator of the associated spectrograph. This slicer would probably consist of only four mirrors of the same radius of curvature.

In using the optical system illustrated in FIGS. 2 to 5, light which does not enter the entrance aperture of the image slicer can be reflected out of the beam for monitoring by an observer, as mentioned above. However, the observer would be looking at the slot (or horizontal image) through the cylindrical lens 11 and, therefore, a correction lens would be required between the observer and the image slicer optical system. An astigmatic spectacle lens has proved to be satisfactory.

Figure 8:
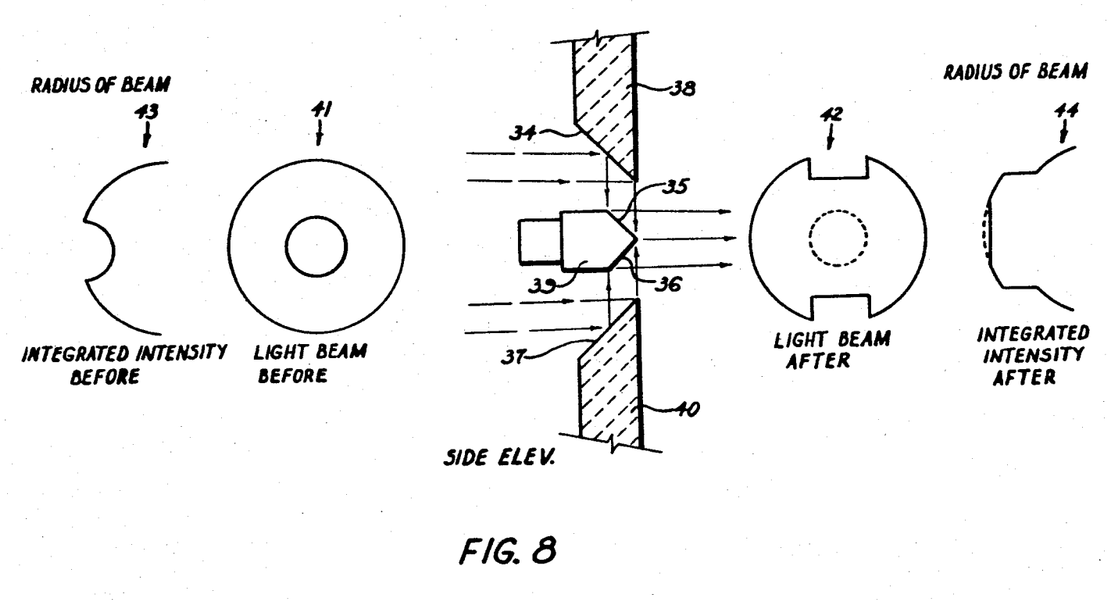
FIG. 8 is a diagrammatic representation of a beam transformer which may be used in conjunction with an optical system according to the present invention.

In using an image slicer optical system according to the present invention at the focus of a reflecting telescope, the illumination along the length of the slit 1, although continuous, was found to be seriously non-uniform and there was a decrease in intensity in the vicinity of the center of the slit 1 because of the shadowing of the central portion of the primary mirror of the telescope. This is, of course, a characteristic of reflecting telescopes and, therefore, a beam transformer optical system as shown in FIG. 8 was designed. As shown in FIG. 8, the beam transformer includes four mirror surfaces 34, 35, 36, and 37 formed on members 38, 39 and 40. A cross-section of the beam before entering the beam transformer is indicated at 41 and a cross-section of the beam after passing through the beam transformer is indicated at 42, together with respective graphical plots 43 and 44 of the integrated intensity across the beam (these are the same as the distribution of intensity which occurs along the length of the slit 1 of FIG. 2).

In operation, the beam transformer of FIG. 8 intercepts a small portion of the incident light before it reaches the image slicer and reflects it, by means of the mirror surfaces 34, 35, 36 and 37, into the center of the beam in order to fill in the shadow.

As will be clear from the above, the purpose of an image slicer optical system according to the present invention is to transform an image of a source of light focussed by some primary optical element so that a larger percentage of the light in the image will pass into a subsequent analyzing device such as a spectrograph or spectrometer. The primary optical element could well be the objective lens of a reflecting telescope, or the primary or secondary mirror of a reflecting telescope, or, in a laboratory, some other optical element which focuses a light source onto the entrance to an analyzer unit. For example, when the entrance to the analyzer unit is in the form of a slit and when the image of the source is circular with a diameter which is greater than the width of the slit but less than the length of the slit, then an image slicer according to the present invention will cause the slit to be illuminated to a greater extent so that light originally intercepted by the slit jaws can be directed into the slot. In this operation, the focal ratio of the cones of light entering the analyzer unit must not be decreased—otherwise, the optics of the analyzer unit would be overfilled and the extra light would be lost. Some form of slicing operation, such as with apparatus according to the present invention, must, therefore, be used in the transformation of the image. The optical system of the present invention introduces light from an external source into a multiple-reflection mirror system which is arranged so that it allows the admission of the light and performs a slicing operation.

It may, in some circumstances, be necessary to introduce certain modifications into an image slicer optical system according to the present invention, for example when dealing with different focal ratios. If the image slicer optical system were to be used at a focus of a small focal ratio on a telescope or in a laboratory, it would be necessary to increase the focal ratio of the light in the image slicer optical system and consequently, of the collimator of the spectrograph in order to prevent the dimensions of the image slicer optical system from becoming impossibly small. This could be done by arranging a negative surface (concave) in the originally "plano" surface of the cylindrical lens 11 of FIG. 2. At the prime focus of a Ritchey-Chretien telescope, this negative surface of revolution could be made aspherical in order to remove the negative spherical aberration produced by the R-C primary.

It is also conceivable that, under certain circumstances, it may be desirable to replace the simple cylindrical and field lenses of FIGS. 2 to 5 by more complex lenses, such as achromats.

It may be necessary, for smaller focal ratios, to introduce a negative lens into the portion of the incident beam which is reflected by the mirrors of the beam transformer (FIG. 8). This lens could well be located at the apex of the two central mirrors 35 and 36 of the beam transformer.

If it is desired to use an image slicer optical system according to the present invention with a Schmidt-type spectrograph, it should be remembered that the plateholder of an on-axis Schmidt camera vignettes a central, rectangular portion of the beam from the grating or prism. Thus, the back of the plateholder intercepts all or part of the brightest slice, which is formed by light taken from the bright center of the stellar image, when the centers of curvature of the slit mirrors 2 and 3 are located on the edges of the slot 10 separating the aperture mirrors 8 and 9 of FIGS. 2 to 5. However, the brightest slice can be directed above or below the plateholder by means of a slight vertical displacement of the field lens and thus one of the second brightest slices would be lost. To avoid this, one of the centers of curvature of the slit mirrors 2 and 3 may be moved vertically by the appropriate amount to produce the required gap between the brightest slice and the second brightest slice. A slice is still lost, of course, by vertical displacement but it is a fainter one from the edge of the stellar image. With this modification, the useable number of slices is limited to four.

It will be appreciated that in FIGS. 2 to 5, it may well be possible to construct a single slit mirror in place of the slit mirrors 2 and 3 and incorporating a suitable slit 1 and also to construct a single aperture mirror in place of aperture mirrors 8 and 9 and incorporating a slot 10.

It will also be appreciated that in the beam transformer as shown in FIG. 8, the surfaces identified as 35 and 36 may, in fact, be one continuous surface, the member 39 being of circular cross-section. In such a case, the members 38 and 40 could well constitute a single optical member with a single continuous reflecting surface 34, 37. It will be seen that the surface 35 is at substantially 45° to the longitudinal axis of the beam of light.

I claim:

1. An optical system for transforming the image of a source of light to facilitate examination, including a pair of aperture mirrors spaced apart to form a slot therebetween for passage of light from said image therethrough, a pair of slit mirrors spaced apart to form a slit therebetween, said slit being at right angles to said slot, said pair of slit mirrors being spaced from the pair of aperture mirrors along the longitudinal axis of the optical system whereby light passing through said slot which does not immediately pass through the slit is reflected one or more times between the aperture mirrors and the slit mirrors so that at least a portion thereof is subsequently directed through said slit after each reflection by the aperture mirrors until substantially all of said light is passed through said slit, the centers of curvature of the aperture mirrors being located at said slit formed by the slit mirrors and spaced apart by a distance equal to the width of the slit formed by the slit mirrors and the centers of curvature of the slit mirrors being located on the extremities of the slot formed by the aperture mirrors and displaced from each other by a distance equal to the width of the slit formed by the slit mirrors.

2. An optical system according to claim 1 wherein said aperture mirrors present a concave surface to said slit mirrors and said slit mirrors present a concave surface to said aperture mirrors.

3. An optical system according to claim 1 wherein the aperture mirrors are preceded in the direction of a beam of incident light by a cylindrical lens capable of forming a line image at said slot in one direction parallel to the direction of said slot and a line image at said slit in a second direction parallel to said slit and at right angles to said one direction.

4. An optical system according to claim 3 wherein a field lens system is provided behind the slit mirrors in the direction of the incident beam.

5. An optical system according to claim 4 including a field lens having a focal length approximately equal to the radius of curvature of the aperture mirrors.

6. An optical system for transforming the image of a source of light to facilitate examination, including a pair of aperture mirrors spaced apart to form a slot therebetween for passage of light from said image therethrough, a pair of slit mirrors spaced apart to form a slit therebetween, said slit being at right angles to said slot, said pair of slit mirrors being spaced from the pair of aperture mirrors along the longitudinal axis of the optical system whereby light passing through said slot which does not immediately pass through the slit is reflected one or more times between the aperture mirrors and the slit mirrors so that at least a portion thereof is subsequently directed through said slit after each reflection by the aperture mirrors until substantially all of said light is passed through said slit, the centers of curvature of the aperture mirrors being located at said slit formed by the slit mirrors and spaced apart laterally by a distance equal to the width of the slit formed by the slit mirrors, whereby the center of curvature of one aperture mirror is located on one slit mirror and the center of curvature of the other aperture mirror is located on the other slit mirror, the centers of curvature of the slit mirrors being displaced laterally from each other by a distance equal to the width of the slit formed by the slit mirrors and displaced vertically by a distance at least equal to the width of said slit, the center of curvature of each slit mirror being located on that aperture mirror which has its center of curvature located on the respective slit mirror.

7. An optical system according to claim 5 wherein said aperture mirrors present a concave surface to said slit mirrors and said slit mirrors present a concave surface to said aperture mirrors.

8. An optical system according to claim 6 wherein a field lens system is provided behind the slit mirrors in the direction of the incident beam.

9. An optical system according to claim 6 wherein the aperture mirrors are preceded in the direction of a beam of incident light by a cylindrical lens capable of forming a line image at said slot in one direction parallel to the direction of said slot and a line image at said slit in a second direction parallel to said slit and at right angles to said one direction.

10. An optical system according to claim 9 including a field lens having a focal length approximately equal to the radius of curvature of the aperture mirrors.

References Cited

UNITED STATES PATENTS

| | | | |
|---|---|---|---|
| 1,652,271 | 12/1927 | Cooke | 350—294 X |
| 1,988,946 | 1/1935 | Hauser et al. | |
| 2,212,211 | 8/1940 | Pfund. | |
| 2,729,143 | 1/1956 | White | 350—294 X |
| 3,164,781 | 1/1965 | Goldberg | 350—294 X |

JOHN K. CORBIN, Primary Examiner

U.S. Cl. X.R.

350—294; 356—98